United States Patent [19]

Lo et al.

[11] Patent Number: 4,959,714
[45] Date of Patent: Sep. 25, 1990

[54] SEGMENTATION METHOD FOR TERMINAL AIMPOINT DETERMINATION ON MOVING OBJECTS AND APPARATUS THEREFOR

[75] Inventors: Thomas K. Lo, Temple City; Jack M. Sacks, Thousand Oaks; Wayne P. Simoni, Canoga Park, all of Calif.

[73] Assignee: Hughes Aircraft Company, Del.

[21] Appl. No.: 229,198

[22] Filed: Aug. 8, 1988

[51] Int. Cl.⁵ .......................... H04N 7/18; H04N 7/00
[52] U.S. Cl. ...................................... 358/125; 358/105; 358/96; 382/22
[58] Field of Search ................. 358/125, 126, 105, 96; 382/22

[56] References Cited

U.S. PATENT DOCUMENTS

| | | | |
|---|---|---|---|
| 4,405,940 | 9/1983 | Woolfson et al. | 358/125 |
| 4,409,661 | 10/1983 | Romanski | 358/125 |
| 4,626,908 | 12/1986 | Tani | 358/125 |
| 4,739,401 | 4/1988 | Sacks et al. | 358/126 |
| 4,783,833 | 11/1988 | Kawabata et al. | 358/105 |
| 4,796,187 | 1/1989 | North | 358/126 |
| 4,805,018 | 2/1989 | Nishimura et al. | 358/96 |
| 4,823,194 | 4/1989 | Mishima et al. | 358/125 |

OTHER PUBLICATIONS

Procedings of the 5th Intern'l Conference on Pattern Recognition, Miami Beach, Fla., Dec. 1–4, 1980, vol. 2, IEEE (U.S.), G. Hirzinger et al.: "Automated TV Tracking of Moving Objects, The DFVLR-Tracker & Related Approaches", pp. 1255–1261, see p. 1255, right-hand column, p. 1256, line 8.

IEEE Transactions on Aerospace and Electronic Systems, vol. AES-17, No. 1, Jan. 1981, D. R. Sullivan et al., "A Coarse Search Correlation Tracker for Image Registration", pp. 29–34.

Primary Examiner—John K. Peng
Attorney, Agent, or Firm—R. A. Hays; R. M. Heald; W. Denson-Low

[57] ABSTRACT

A conventional tracker 14 is used to continually aim a sensor 12 at a flying object so that it is located in substantially the same spatial location in a plurality of image frames taken at different times. Thus, the object remains in about the same spatial position in each image frame while the background clutter generally changes. By processing two or more of the image frames it is possible to calculate a more precise aimpoint for the object than is generally provided by the track point.

10 Claims, 5 Drawing Sheets

SEGMENTATION METHOD FOR TERMINAL AIMPOINT DETERMINATION ON MOVING OBJECTS AND APPARATUS THEREFOR

BACKGROUND OF THE INVENTION

1. Technical Field

This invention relates to image processing and, more particularly, to techniques for determining a positive aimpoint on an object moving through heavy background clutter.

2. Discussion

One of the most important factors in the design of a guidance system is the determination of a suitable final aimpoint on the object of interest (target). It is usually necessary to pinpoint a vital part on the object since a near miss or a hit on a noncritical part will not accomplish the objectives of the task. For example, if the objective of a guidance system is to position a drill so that a hole can be drilled at a specific spot (aimpoint) of a workpiece, it is absolutely vital that the aimpoint be precisely identified.

For the purposes of this discussion, we will assume a tracker is on a moving platform and is used to direct the platform (seeker) toward a specified point on the object of interest. In the case of a tracker which employs an IR (infrared) sensor, the tracker will usually lock onto and track the warmest feature or spot on the object. For example, if the object is a moving vehicle with internal propulsion, the hotspot position (track point) does not necessarily coincide spatially with a desirable aimpoint on the object since desirable aimpoints usually reside on the main body of the object and are dependent on the goals of the task.

In order to achieve such an aimpoint, the entire outline or silhouette of the object, or at least a major portion of it, must be extracted from the background. This process of extraction, which is referred to as "segmentation" by the image processing fraternity, is generally considered to be one of the most difficult and challenging problems encountered in the design of systems which employ image processing technology.

The difficulty of segmentation is a result of the presence in the field of view of one or more interference or confusion factors which cause the object of interest to be either incompletely segmented or occluded by interfering objects, or "clutter". Compounding the problem further is the inevitable presence of noise. In addition to these interferences, some sensors produce a form of noise known as "fixed pattern noise", which results from detector-to-detector nonuniformities in gain and d.c. offset.

Each of these problems requires its own particular solution, and quite often conflicts arise between the various remedies. For this reason, it is necessary to provide techniques whose purposes are to determine which segmentation process is appropriate to a given situation or set of conditions in the real world. Techniques of this type have the function of evaluating the scene content in order to quantitatively assess the levels of clutter and noise.

SUMMARY OF THE INVENTION

In this invention, a terminal aimpoint method is disclosed which should substantially reduce at least some of the problems alluded to and increase the probability of meaningful contact on a moving object.

According to the method of this invention, a tracker is used to track the movement of an object and generate a track point for the object as it moves. The track point is used to continually aim a sensor at the moving object so that it is located in substantially the same spatial location in a plurality of frames of image data taken at different times. Consequently, the object remains substantially in the same spatial position in each image frame while the background will generally change. Then, the image frames are subtracted from each other. The difference between pixels associated with the object will be much less than the difference between pixels associated with the background thereby facilitating a subsequent segmentation step for generating a binarized output which can be used to generate a more precise aimpoint than if the track point only was used.

BRIEF DESCRIPTION OF THE DRAWINGS

The various advantages of this invention will become apparent to those skilled in the art after a study of the following specification and by reference to the drawings in which.

DESCRIPTION OF THE PREFERRED EMBODIMENT

Figure 1:
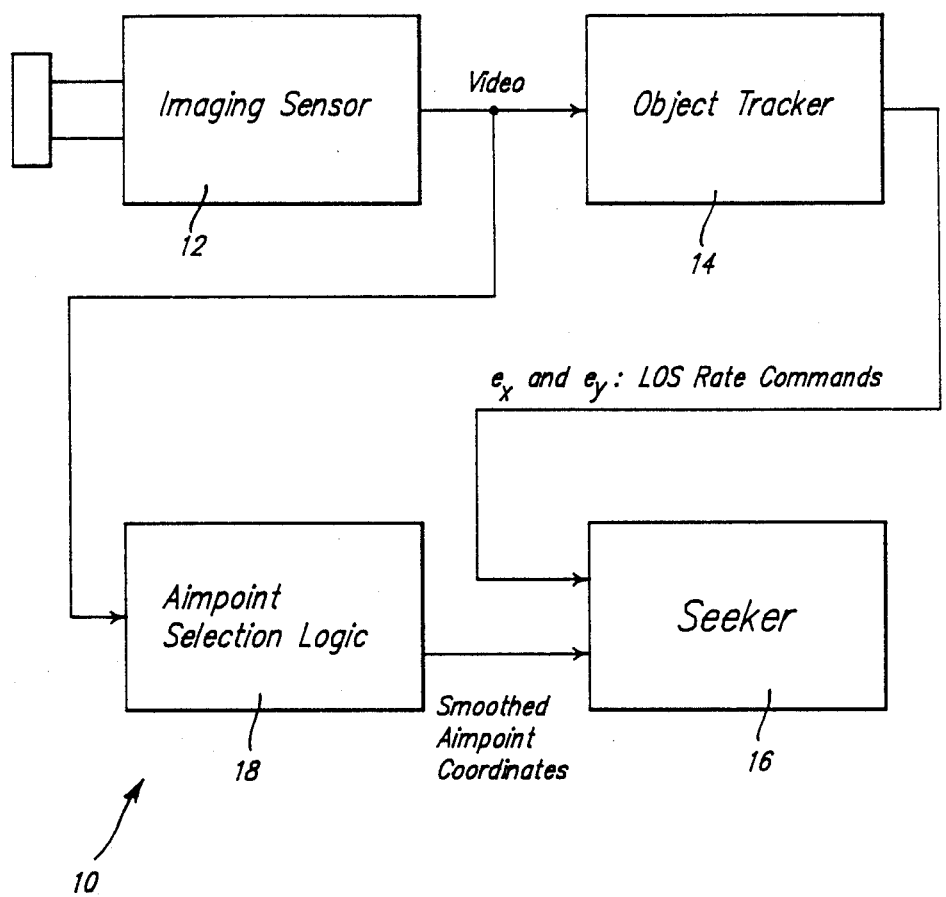
FIG. 1 is a block diagram of major functional components of the preferred embodiment of the present invention.

For the purpose of this invention, the preferred aimpoint must be distinguished from the track point. This is in contrast to conventional guidance systems where the policy has been to aim at the point which the tracker has computed to be the center of tracking (this point is usually the centroid or first moment of the segmented bilevel video "blob" which has been extracted from the scene and designated as the object of interest).

We shall define the track point to be a point on the object's image which has been segmented by the tracker preprocessor. The position of this point in the field of view FOV is converted to x and y error signals which keep the selected object centered in the FOV. Since the platform must be able to move rapidly in order to remain locked onto the designated object, these error signals must be relatively wideband.

The aimpoint, on the other hand, may or may not be coincident with the track point. If the object of interest is fully segmented by the tracker preprocessor, the aimpoint and the track point will be essentially coincident. It is more likely, however, that the tracker preprocessor will only partially segment the designated object because of the necessity for avoiding the digitization of clutter; in this case the aimpoint will be displaced from the track point by an amount dependent on the incompleteness of segmentation.

With the segmentation method of this invention, a more suitable aimpoint will be computed. A displaced aimpoint based on a more complete segmentation of the object of interest will become the actual point toward which the platform will be directed. It is expected that the coordinate offsets in x and y between the aimpoint and the track point will not change rapidly in actual operation. The aimpoint offset signals, therefore, need not carry wideband rate information, since they represent only positional displacements of the aimpoint relative to the track point. These displacement values may therefore be computed at a relatively leisure pace, and may be highly smoothed.

At some point during closure of the platform on the designated object, the tracking function will probably be handed over to an area correlator, which will control the platform until "blind range" is reached or impact occurs, whichever occurs first. Handover must be such that the designated initial correlator aimpoint is coincident with the computed tracker aimpoint rather than the track point.

In the absence of background clutter, it is a relatively simple matter to segment all or most of the designated object. With clutter present, the segmentation problem generally becomes much more difficult, because the designated object's signature may not be distinguishable from clutter objects.

The method of this invention is conceptually quite simple. It is based on the assumption that background clutter is not spatially homogeneous in brightness. It is also assumed that the object is being tracked by a conventional gated video tracker or a correlation tracker; the object's image, therefore, is held in a fixed spatial position in the FOV, while the background moves "behind" it. Examples of video and correlation trackers are disclosed in Wolfe, C. L. and Zissis, G. L., "The Infrared Handbook", Section 22-7, "Imaging Trackers", pages 22-63 thru 22-87; The Infrared Information and Analysis (IRIA) Center, Environmental Research Institute of Michigan, 1978. These references are hereby incorporated by reference.

Let us now consider two frames of video or image data. These frames need not be temporally adjacent although it is advantageous to employ adjacent frames if possible.

The "present" frame is sampled on a pixel-to-pixel basis in real time, whereas the "past" frame is sampled out of memory in spatial pixel alignment with the present frame. In other words, when expressed in frame coordinates, corresponding pixels are simultaneously available for processing from both frames.

In cluttered areas of a scene, it is relatively unlikely that both frame samples of a particular pixel will be equal in value, whereas in those areas of the scene occupied by the object of interest, it is probable that both frame samples will be equal or at least close to one another in value (noise is obviously a limiting factor in determining the statistical closeness of the sample values; changes in object image size or aspect during closure is another).

The process to be applied to each pair of temporal pixel values consists of determining the difference between the values of each pair. The differences computed for those pairs comprising background will have greater values than the differences for those comprising the object of interest. In fact, the values for the designated object pairs will cluster near zero (the deviation of these values from zero will depend on the noise level and on the residual variations induced by the effects of short term maneuvering or object signature variation).

To substantially separate the object of interest from clutter we need only apply a threshold based on the measured noise level in the signal to binarize the data. The resulting binarized pattern will contain a reasonably complete silhouette of the object together with a scattering of binarized pixels which represent errors wherever the differences in the background pixels happen to be equal to or near zero.

In order to reduce the number of background "leakage" pixels in the processed binary scene, more than two frames can be employed. Consider the case in which three consecutive frames are used.

The process starts with the first two frames. It is not necessary to store these frames themselves, but the maximum (MAX) of each pair of values should be stored in one frame memory and the minimum value (MIN) of each pair in another. As the third frame is scanned out, each pixel value is compared to the stored value which occupied the same pixel position in the preceding two frames. If the value of the pixel in the new (third) frame is greater than the value of that same pixel in the MAX memory, it replaces the stored value; if the new pixel is less than the value of the same pixel in the MIN memory, it replaces that value. At the end of the third frame we will have stored in the MAX and MIN memories the maximum and minimum values respectively of each pixel, as evaluated over all three frames.

As the process proceeds the minimums are subtracted from the maximums pixel by pixel and the differences compared to a noise based threshold, exactly as was done in the two frame example. The resulting bilevel image will contain a reasonably accurate silhouette of the designated object, along with fewer bileveled background samples than would be the case with the two frame example.

The reason for the smaller number of binarized background samples is based on the assumption that the background is "moving" relative to the tracked object in the image, and therefore the probability of three samples being equal to each other is less than the probability of two being equal. Therefore, a background pixel is less likely to be identified as an object pixel in the bilevel image.

Obviously, this process can be carried out over four or more frames with a monotonically increasing reduction in the probability of binarizing the background as the number of frames processed is increased.

Since smaller changes in the object's image are likely to occur with each passing frame, the process will eventually reach a point of diminishing returns when the bilevel object is so seriously degraded that aimpoint designation is adversely affected. Noise in the image will also ultimately degrade the aimpoint. The process should be terminated before this point is reached.

FIG. 1 is a system conceptual block diagram showing the system 10 of this invention and the relationships of the major functional subsystems. The video output of the imaging sensor 12 enters the object tracker 14. This tracker may be of any conventional type, such as a gated video centroid tracker, a hot spot tracker, or a correlation tracker such as those examples given before. The output signals from the tracker are error signals $e_x$ and $e_y$, which command LOS (line of sight) rates to the platform or seeker 16. A suitable example of a seeker is disclosed in the above referenced citations. The video also enters aimpoint selection logic 18, which derives smoothed aimpoint offsets in frame coordinates.

The smoothed aimpoint coordinates are appropriately combined with the tracking error signals in the seeker loops. A seeker loop is a control (servo) system which calculates the angular rate of the object with respect to the sensor optical axis through successive measurements of the error signal. The computed rate is used to point the sensor at the object so as to null out the angular rate between the object and the optical axis. The error signal is also used to guide the platform or seeker toward the object. A detailed discussion of track loops or seeker loops is found in Wolfe, C. L. and Zissis, G. L., "The Infrared Handbook", Chapter 22; "Tracking Systems", pages f22-3 thru 22-8. The Infrared Information and Analysis (IRIA) Center, Environmental Research Institute of Michigan, 1978. The aimpoint coordinates, which need only accommodate slow changes, should be slaved to the wideband error signals which command the LOS rates. Thus the seeker can be guided toward the chosen aimpoint, whereas the actual track point is offset, and the tracking rate capability can be made fast enough to enable the seeker to follow rapid object motions and maneuvers.

Figure 2:
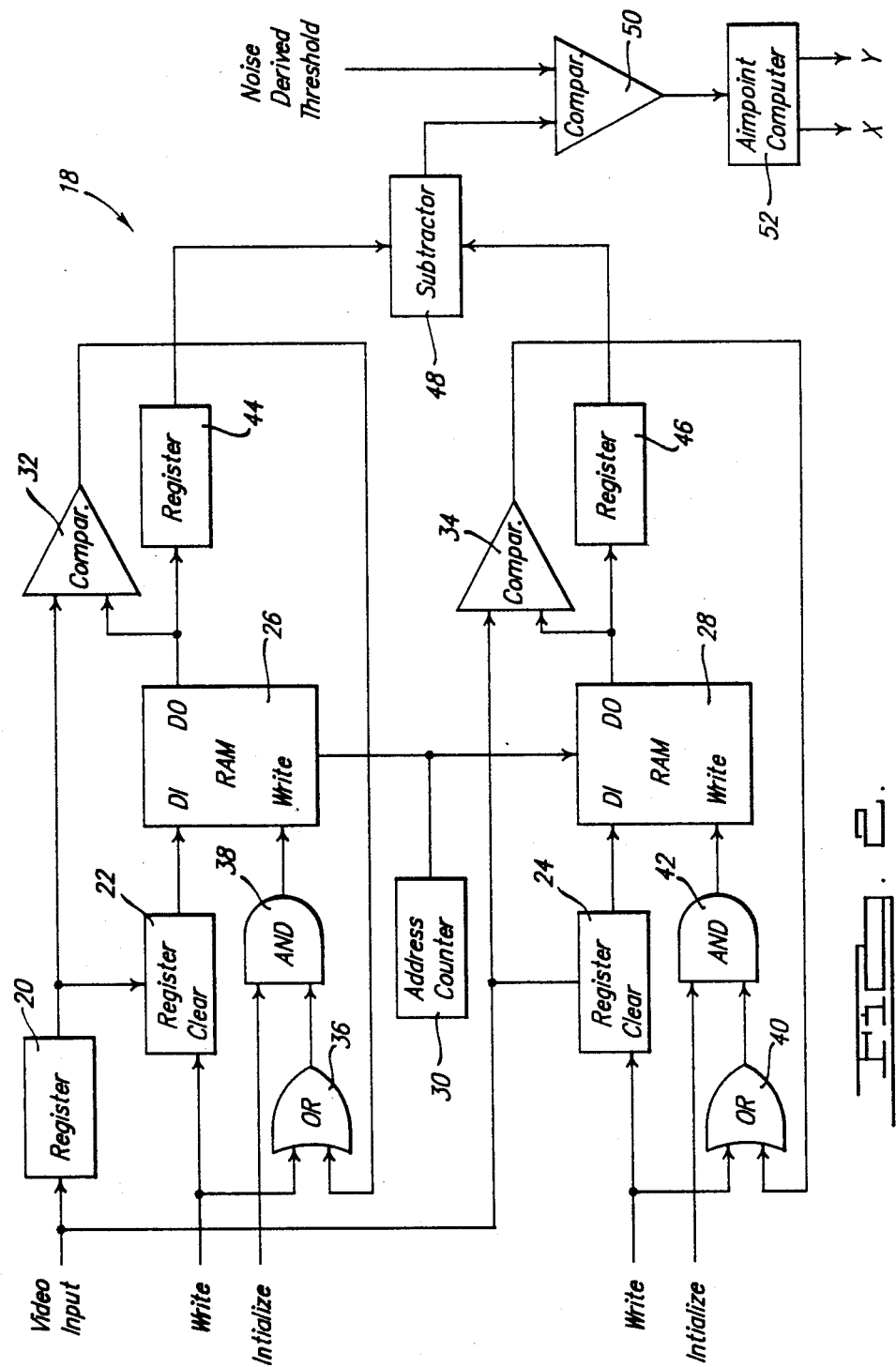
FIG. 2 is a schematic diagram of aimpoint selection logic circuitry used in the preferred embodiment.

FIG. 2 is a functional block diagram of the aimpoint selection logic 18.

Registers 20, 22 and 24 are data holding registers. Video enters register 20 where it is stored for the purpose of providing time for a read-modify-write cycle in random access memories (RAMs) 26 and 28. RAM 26 stores maximum pixel values in the scene, whereas RAM 28 stores minimum values. Data in RAM 26 will appear sequentially at the output terminal DO as the address counter 30 cycles through the stored scene, pixel by pixel. The data enters comparator 32 where it is compared in magnitude with the incoming real time pixel value in register 20. If the real time pixel magnitude is greater than that at the output terminal DO, it replaces the stored value to which it has been compared in RAM 26; if not, the stored pixel remains in its space in RAM 26.

Similarly, comparator 34 determines whether the real time pixel value is less than the value stored at the corresponding pixel address in RAM 28. If so, the real time pixel value replaces the stored value at that address in RAM 28.

Logical "OR" 36 and logical "AND" 38 comprise a logic arrangement which performs two functions: it allows RAM 26 to be initialized so that all addresses contain the minimum allowable pixel value at the beginning of the process, and it enables comparator 32 to update RAM 26 whenever the real time pixel value exceeds the corresponding stored value.

Logical "OR" 40 and logical "AND" 42 perform similar functions with respect to RAM 28, except in this case RAM 28 is initialized to the highest allowable pixel value.

Registers 44 and 46 are holding registers which contain data to be differenced in subtractor 48. This data represents maximum and minimum values respectively of the sequentially sampled scene pixels. The difference values enter comparator 50 where they are compared with a threshold whose value is proportional to the measured noise level in the scene (there are several simple methods, widely known to those skilled in the art, for measuring noise). As a result of the process described here, a binarized silhouette of substantially all of the object will appear at the output terminal of comparator 50. This essentially complete binary representation of the object is sufficient for accurate aimpoint designation on the desired object, at least under most circumstances.

Aimpoint computer 52 receives the binary object image and computes the coordinates of an appropriate aimpoint. There are a number of well known techniques for computing an effective aimpoint if the object is efficiently segmented, as it should be by the present process. A particularly good aimpoint selection would be the geometric centroid or first moment of the object silhouette.

After smoothing (low pass filtering) the x and y coordinates of the computed aimpoint, they are fed into the seeker loops where they are appropriately combined with the tracker error signals (or correlator error signals, as the case may be).

Figure 3:
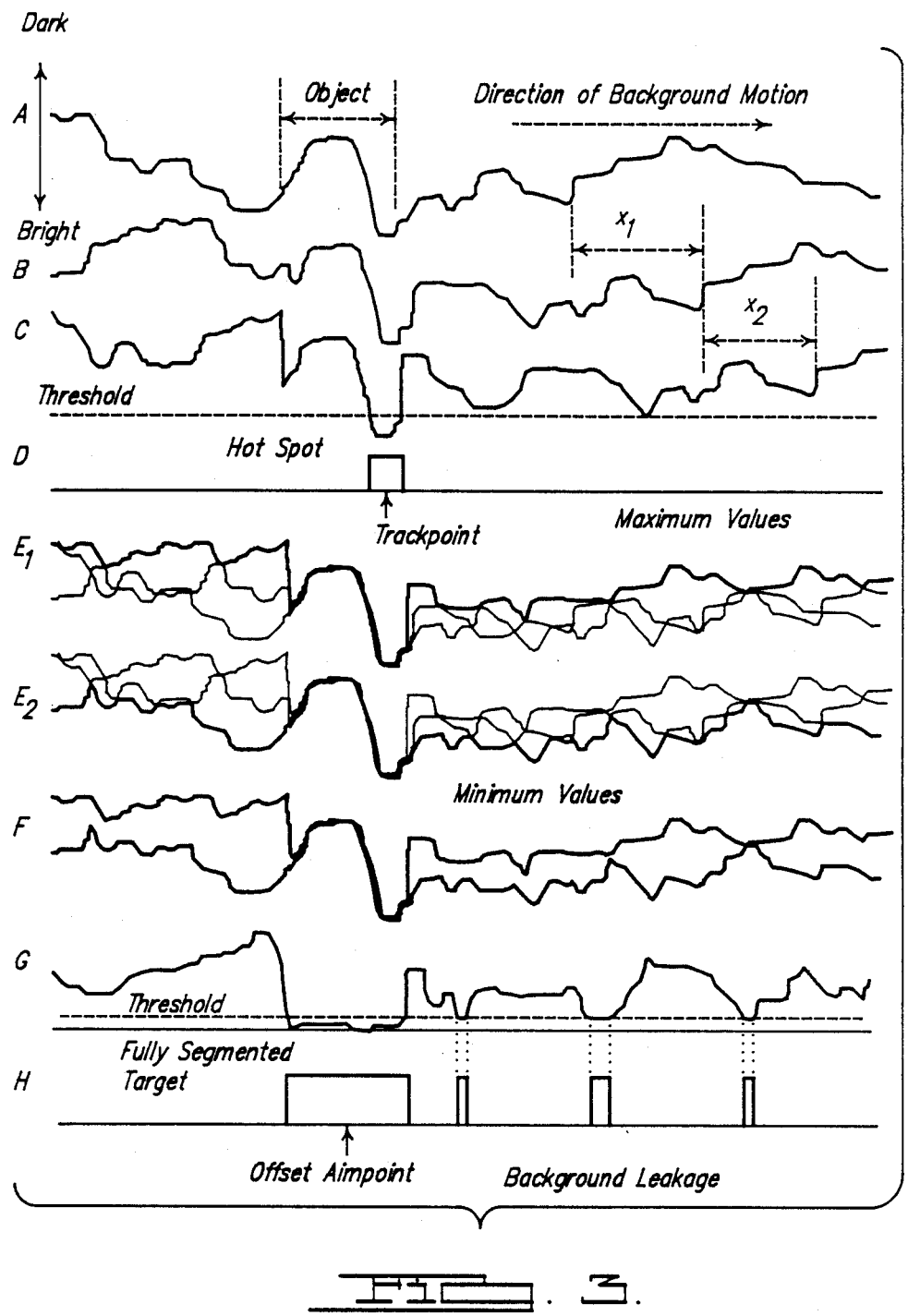
FIG. 3 comprises a series of waveforms useful in understanding the operation of the present invention.
Figure 4A:
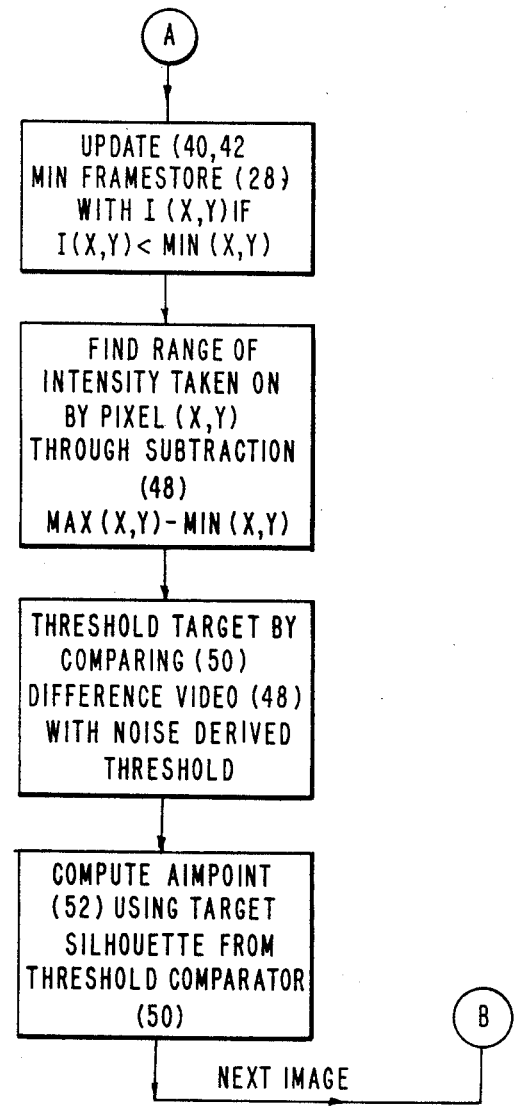
FIG. 4 is a flow chart of a preferred embodiment of the present invention.
Figure 4B:
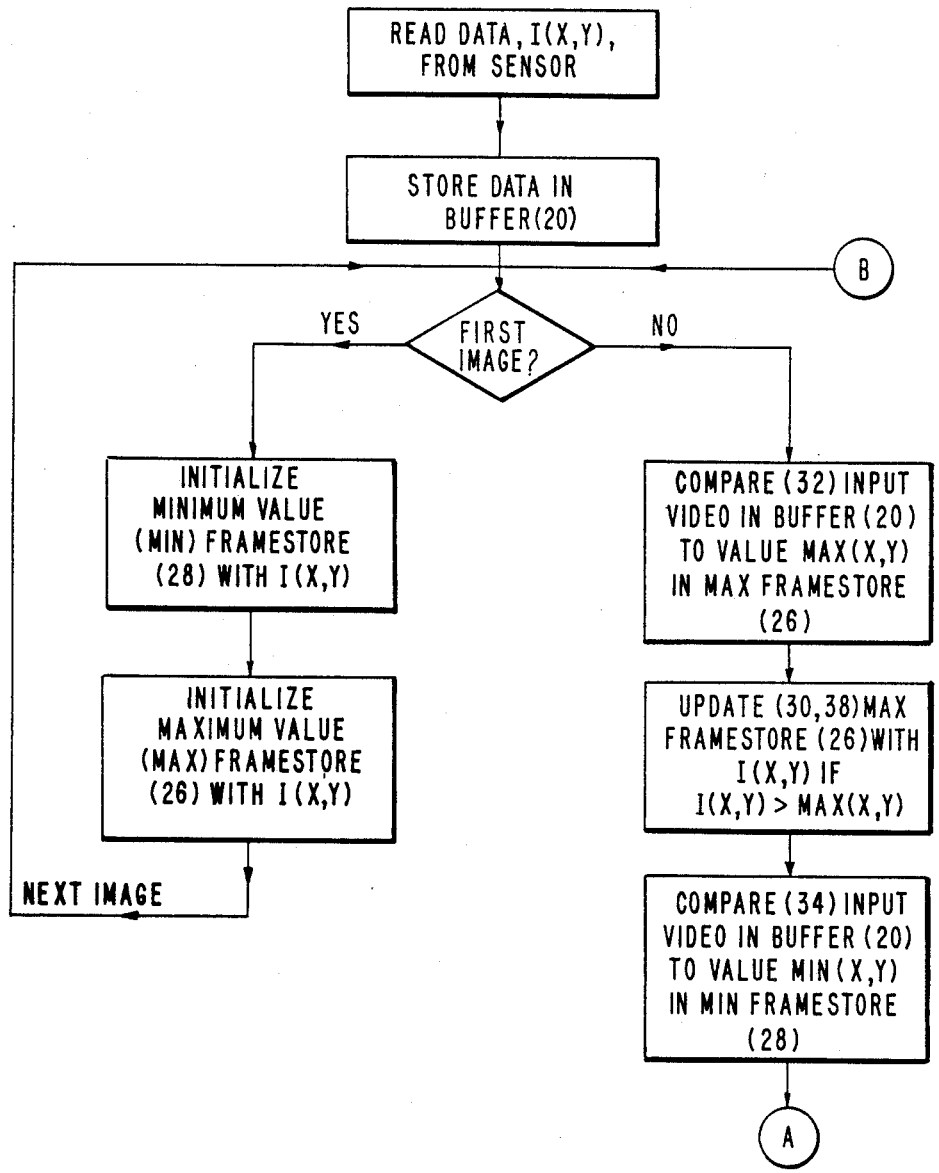

FIG. 3 is a graphic illustration of the process. This is a one dimensional illustration employing three lines, but it should be understood that the process applies equally well to two dimensional functions, such as images or scenes and in fact is more broadly applicable to two or three dimensional imagery (where time is the third dimension).

Video lines A, B, and C represent three successive images which substantially overlap in space. Line B is displaced to the right a distance $x_1$ with respect to line A, and line C is placed to the right a distance $x_2$ with respect to line B. The object, which is shown bracketed, is maintained in substantially the same position on each line by virtue of its being tracked by a hot spot tracker.

Line D represents thresholded or bileveled video, segmented for use by the tracker. The track point is situated in the center of the segmented bilevel video.

Line $E_1$ is a composite of lines A, B, and C. The heavy black line represents the maximum pixel values. These values are computed pixel by pixel, one sample per pixel for each of the three lines.

Line $E_2$ is also a composite of the three lines, but in this case the minimum pixel values are emphasized in heavy black.

Line F is a composite of the maximum and minimum values. Observe that in the region of the desired object the maximum and minimum values substantially coincide (in the real world, changes in object attitude or size will reduce the region of max-min "equality", as will the effects of noise. Although these effects will reduce the overall "accuracy" of the aimpoint determination process, the resulting aimpoint will nevertheless be significantly superior to use of the track point for aimpoint purposes in the vast majority of cases.).

Line G shows the results of subtracting the minimum values from the maximum values. In the region of the object, the differences will be equal to or near zero, whereas in most regions of the background, the differences will exhibit a significant positive value, except for a few relatively improbable pixels where the values of the three samples are substantially equal to each other. The more background clutter, the better the method works.

If the difference signal is thresholded as shown in G, substantially complete segmentation of the designated and tracked object can be accomplished with very little background "leakage" or corruption as shown in H. The aimpoint can now be set in the center of the segmented "blob", with a resulting substantial increase in accuracy and effectiveness over that achievable by using the track point as an aimpoint. (Compare the location of the track point and aimpoint arrows in lines D and H). Tracking will also be more reliable in that the tracker's segmentation threshold can be raised away from the background clutter, and thus the possibility of loss of lock will be reduced.

Observe that the new segmentation technique virtually guarantees the complete segmentation of the tracked object regardless of the polarity or combination of polarities of its video signature.

Obviously, increasing the number of lines to more than three will reduce the number of background leakage digitizations since the probability of more than three background values being equal is significantly less than the probability of three being equal. On the other hand, if too many lines are processed the probability will increase that the object's silhouette will be corrupted by noise or signature changes. As is usually the case, a well reasoned compromise is the best solution.

What is claimed is:

1. A method of detecting the spatial location of a moving object, said method comprising:
   generating a track point for the object as it moves;
   using the track point to continually aim a sensor at the object so that it is located in substantially the same spatial location in a plurality of image frames taken at different times whereby the object remains substantially in the same spatial position in each image frame while the background generally changes;
   subtracting at least two of the image frames to generate a difference image in which pixels associated with the object will have values substantially less than those associated with the background;
   applying a given threshold level to the difference image to generate a binarized signal; and
   using the binarized signal to calculate an aimpoint which is more closely associated with the centroid of the object than the track point.

2. The method of claim 1 wherein the track point is calculated from infrared characteristics of the object.

3. A method of determining an aimpoint to be used by a seeking device to contact a centroid of a moving object, said method comprising:
   generating a track point by sensing a physical characteristic of the object;
   using the track point to continually aim an image sensor at the object so that it is located at substantially the same spatial location in a plurality of image frames taken at different times whereby the object remains substantially in the same spatial location in each image frame while the background generally changes;
   processing the frames of image data to generate an aimpoint which is more closely associated with the centroid of the object than the track point said processing including the step of subtracking at least two of the image frames to generate a difference image in which pixels associated with the object have values substantially less than those associated with the background;
   thresholding the difference image to generate a binarized signal; and
   calculating the centroid of that portion of the binarized signal associated with the object.

4. The method of claim 3, wherein the physical characteristic is infrared energy transmitted by the object.

5. In an apparatus for generating an aimpoint for a seeking device adapted to make contact with an object moving through a cluttered background, the apparatus comprising:
   video input means for providing a current image frame of pixel data containing the object;
   first memory means for storing maximum pixel values for each pixel position in a plurality of earlier taken image frames where the object remains substantially in changes as the object moves through space;
   first comparator means coupled to the input means and the first memory means for comparing corresponding pixel values therein and updating the memory with the maximum value;
   maximum register means for storing the contents of the first memory after the first comparator means has made comparison with at least three frames of image data;
   second memory means for storing minimum pixel values for each pixel position in said earlier taken image frames;
   second comparator means coupled to the input means and the second memory means for comparing corresponding pixel values therein and updating the second memory with the minimum value;
   minimum register means for storing the contents of the second memory means after the second comparator means has made comparison with at least three frames of image data;
   subtractor means for subtracting corresponding pixels in the maximum and minimum register means whereby pixels associated with the object will have relatively low values as compared with background pixels;
   third comparison means for thresholding the output of the subtractor means with a value related to noise in the image frames;
   means for sensing characteristics of the object, said sensing means generating tracker error signals;
   computer means coupled to the output of the third comparator means for calculating selected coordinates of geometrical characteristics of the object from the thresholded image whereby the coordinates can be combined with tracker error signals for guiding the seeking device to a predetermined geometrical location on the object.

6. The apparatus of claim 5 wherein said means for sensing characteristics of the object senses infrared characteristics of the object.

7. The apparatus of claim 5 wherein said selected coordinates are related to the centroid of the object.

8. An apparatus for detecting the spatial location of a moving object, said apparatus comprising:
   means for generating a track point for said object as it moves;
   means for using said track point to continually aim a sensor at said object so that it is located in a plurality of image frames taken at different times such that said object remains substantially in the same spatial position in each image frame while the background generally changes;
   subtracting at least two of the image frames to generate a difference image in which pixels associated with said object will have values substantially less than those associated with the background;
   means for applying a given threshold level to the difference image to generate a binarized signal; and
   means for using said binarized signal to calculate an aimpoint that is more closely associated with the centroid of said object than said track point.

9. An apparatus for determining an aimpoint to be used by a seeking device to contact a centroid of a moving object, said apparatus comprising:
   means for generating a track point by sensing a physical characteristic of said object;

means for using said track point to continually aim an image sensor at said object so that it is located at substantially the same spatial location in a plurality of image frames taken at different times such that said object remains substantially in the same spatial location in each image frame while the background generally changes;

means for processing the frames of image data to generate an aimpoint that is more closely associated with the centroid of said object than said track point; said processing means includes:

means for subtracting at least two of the image frames to generate a difference image in which pixels associated with the object have values substantially less than those associated with the background;

means for thresholding the difference image to generate a binarized signal; and means for calculating the centroid of that portion of the binarized signal associated with said object.

10. A method of determining an aimpoint to be used by a seeking device to contact a centroid of a moving object, said method comprising:

generating a track point by sensing a physical characteristic of the object;

using the track point to continually aim an image sensor at the object so that it is located at substantially the same spatial location in a plurality of image frames taken at different times whereby the object remains substantially in the same spatial location in each image frame while the background generally changes;

processing the frames of image data to generate an aimpoint which is more closely associated with the centroid of the object than the track point;

comparing the values of corresponding pixels in at least three image frames and storing the maximum value in a first memory and the minimum pixel value in a second memory;

subtracting the minimum pixel values from the maximum panel values to generate a difference image in which those pixel positions associated with the object will have a difference value close to zero while pixel positions associated with background will have substantially greater values;

applying a positive threshold value to the difference image to generate a binarized signal; and calculating the aimpoint from the centroid of portions of the binarized signal associated with the object.

* * * * *

UNITED STATES PATENT AND TRADEMARK OFFICE
CERTIFICATE OF CORRECTION

PATENT NO. : 4,959,714
DATED : September 25, 1990
INVENTOR(S) : T.K. LO, et al.

It is certified that error appears in the above-identified patent and that said Letters Patent is hereby corrected as shown below:

In claim 5, at Column 8, line 1, after "in" and before "changes" insert --the same spatial position in each frame but the background--.

In claim 10, at Column 10, line 16, delete "panel" and insert in lieu thereof --pixel--.

Signed and Sealed this

Twelfth Day of May, 1992

Attest:

DOUGLAS B. COMER

*Attesting Officer*  *Acting Commissioner of Patents and Trademarks*